United States Patent [19]
Lambert

[11] Patent Number: 6,112,833
[45] Date of Patent: Sep. 5, 2000

[54] BORE HOLE DRILLING DEVICE

[76] Inventor: Kenneth W Lambert, 405 Mt. Crawford Ave., Bridgewater, Va. 22812

[21] Appl. No.: 08/868,388

[22] Filed: Jun. 3, 1997

Related U.S. Application Data

[62] Division of application No. 08/580,469, Dec. 28, 1995, Pat. No. 5,634,515.

[51] Int. Cl.[7] ............................. E21B 10/00; E21C 25/04; E02D 29/00
[52] U.S. Cl. .............................................. 175/62; 175/393
[58] Field of Search ..................... 175/214, 393, 175/415, 417, 418, 327, 62

[56] References Cited

U.S. PATENT DOCUMENTS

| | | | |
|---|---|---|---|
| 4,099,585 | 7/1978 | Emmerich | 175/320 |
| 4,190,125 | 2/1980 | Emmerich et al. | 175/410 |
| 4,190,128 | 2/1980 | Emmerich | 175/410 |
| 4,492,278 | 1/1985 | Leighton | 175/410 |
| 4,540,056 | 9/1985 | O'Hanlon | 175/393 |
| 4,819,748 | 4/1989 | Truscott | 175/410 |
| 4,911,729 | 3/1990 | Rooker | 175/393 |
| 5,092,717 | 3/1992 | Fischer | 408/59 |
| 5,452,628 | 9/1995 | Montgomery, Jr. et al. | 76/108.2 |

*Primary Examiner*—Eileen Dunn Lillis
*Assistant Examiner*—Gary S. Harsmann
*Attorney, Agent, or Firm*—Sheldon H. Parker

[57] ABSTRACT

The geothermal heat transfer system comprises a plurality of heat exchange loops placed in the ground at an angle of less than a 20 degrees, but greater than a 5 degrees. Each loop has an out flow line and a return line, and a fluid tight, tapered end, U-turn juncture connecting the lines. A pair of distributors connects to inlet and outlet lines at a lower end and a plurality of outlet members at the upper end. A heat exchange device connects to the loops through the inlet and outlet lines. A liquid-oil-gas separator uses cup member and deflector to create a Venturi fluid inlet to separate the oil, returning it to the compressor. A bore hole drilling device comprises an hollow drilling bit with a cutting member at one end, a central fluid passage, and connecting means. The bore hole drilling device has a swivel member with a body portion and housing with a central bore and an inlet, connect to a water line. The body is position within the central bore and mounted for rotational motion within the housing.

7 Claims, 12 Drawing Sheets

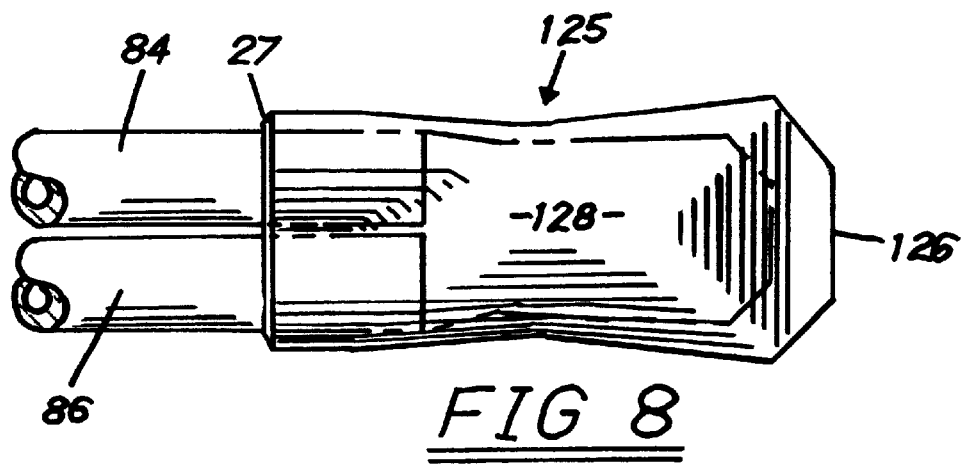
FIG 8
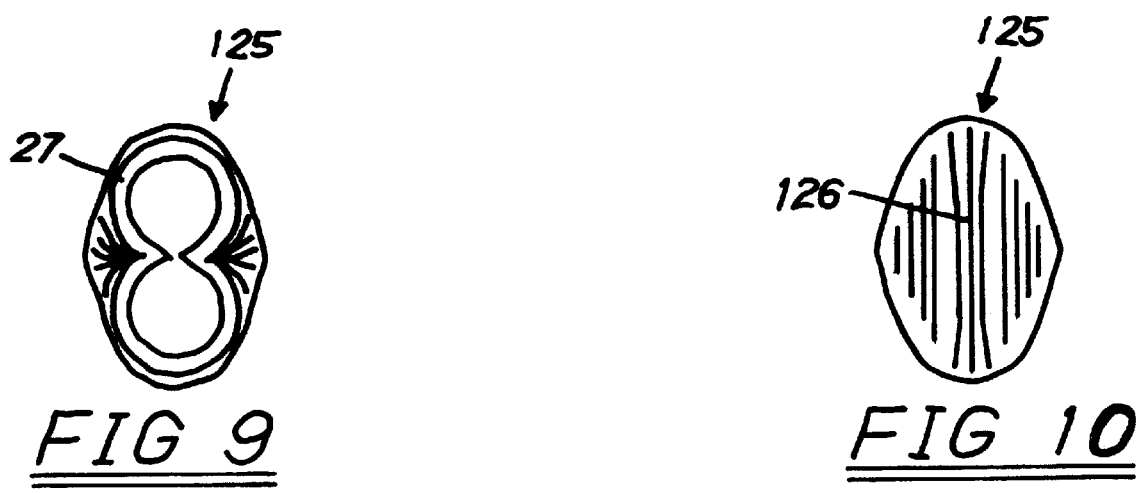
FIG 9
FIG 10
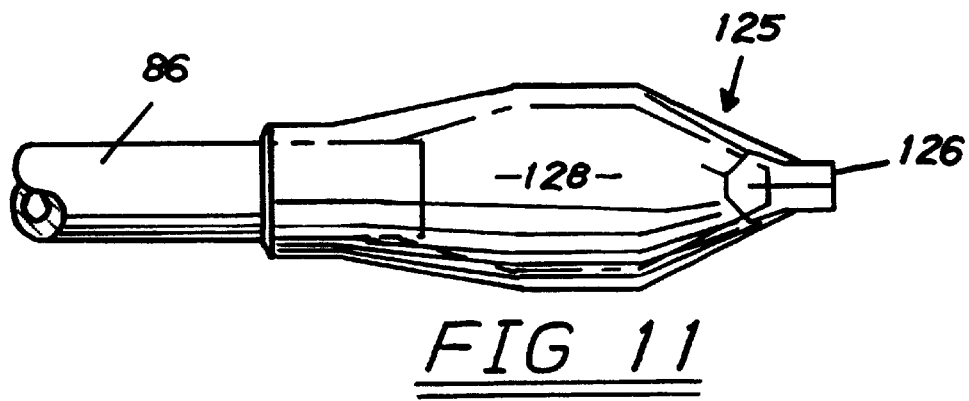
FIG 11

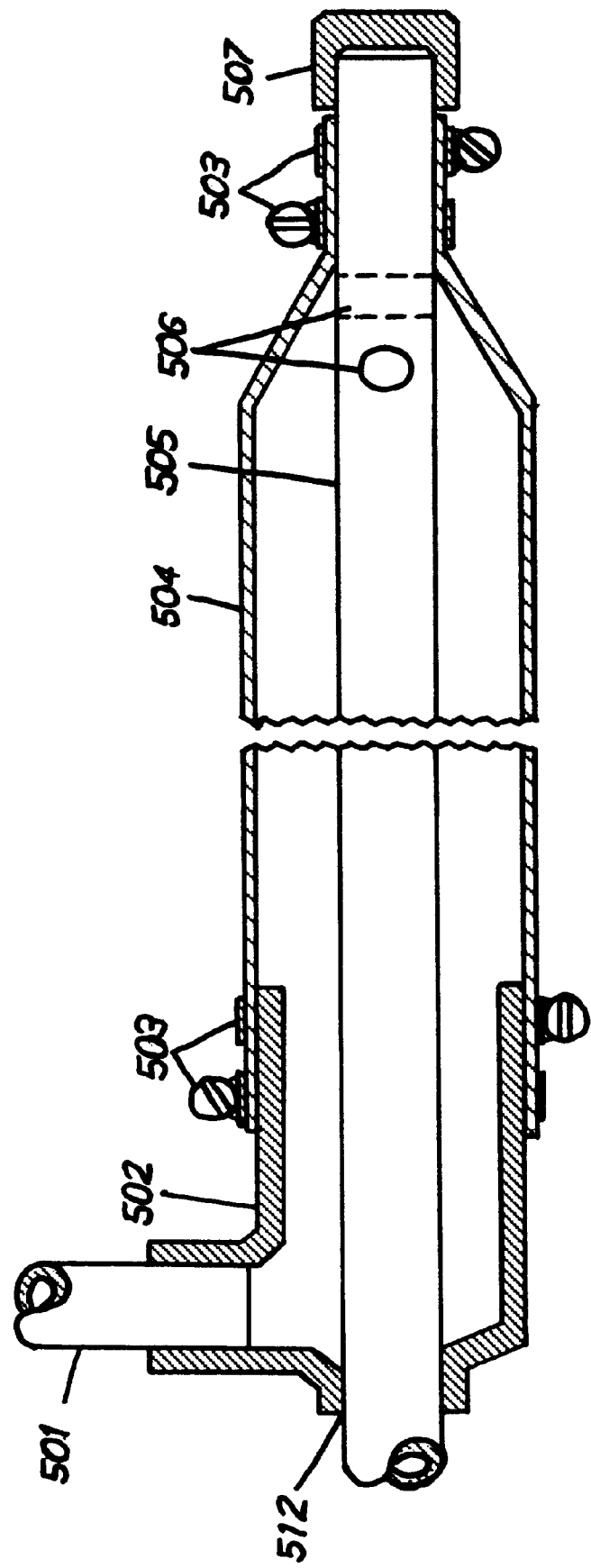

BORE HOLE DRILLING DEVICE

This is a divisional Ser. No. 08/580,469 filed on Dec. 28, 1995, U.S. Pat. No. 5,634,515.

FIELD OF THE INVENTION

The invention relates to an economical and easy to install geothermal heat-pump system which utilizes horizontal ground loops. The system is environmentally friendly and can be installed in most already developed locations, such as existing apartment complexes, as well as to-be-developed areas. The invention is directed to novel heat exchange loops, the method of installing the loops and devices for use in the installation process and in association with the loops.

DESCRIPTION OF THE RELATED ART

The instant invention involves the use of the earth as a constant source of heat to be extracted by a heat pump. Geothermal or ground-source heat pumps, although costly to install, have been found to more efficiently heat and air condition building spaces than other heat pumps. It is much more efficient to extract heat from a substance such as earth, which has a near-constant temperature, than form air which can be subject to severe temperature variations.

Prior art geothermal systems have utilized ground loops that have been installed horizontally using open trenches. Horizontal installation, however, causes significant damage to the environment. Nature has suffered from root-system damage and removal of vegetation caused by the huge displacement of earth required by horizontal ground loop installation. Landscaping has often been destroyed by the large displacement of earth, removal of trees, shrubs, structures, and grass. Parking lots, driveways, sidewalks, and curbs have been removed, damaged, or their installation delayed for long periods of time to allow for the settling that must occur after massive displacements of earth. Moreover, polluted run-off from the large excavations has disturbed the environment in areas beyond the job site. Furthermore, the huge excavating equipment is destructive in its weight, size, and polluting use of fossil fuels.

The installation of prior horizontal ground loops requires the subcontracting of big, expensive equipment and specialized personnel to perform very time-consuming drilling, excavating of trenches, and installation. The equipment used for these excavations is extremely expensive and is not owned by many HVAC installers. The man-hours required to install prior art horizontal loops is extensive and costly. Deep, dangerous ditches are dug and painstakingly prepared. Workers then spend many hours installing specialized pipes and fittings. Finally, the ditches are carefully filled and left for settling. Land that has had a prior art ground loop system installed must remain untouched for as much as a year and a quarter to allow for settling. This is an unacceptable delay to the installation of landscaping, parking lots, sidewalks, curbs, driveways, etc. The untouched ground is not only unsightly, but provides dust which is carried by the wind to undesirable places (i.e. indoor surfaces, wet paint and caulk, lungs, eyes, etc.).

Many owners of modern homes and commercial buildings, as well as town houses, condominiums, apartments, etc. have land areas that are too restrictive for prior art horizontal ground loop installation. Many homeowners wishing to change to geothermal heating systems forego the conversion due to the destruction of existing landscaping and wooded areas as well as other improvements. The ditch excavation required for prior art ground loops is simply not feasible for homes located on rocky land.

The obvious next step is to install vertical ground loops. Vertical ground loop installation requires the use of large cumbersome 6" vertical boring machinery mounted on large trucks weighing in at 15 tons or more. Few people want these monstrous machines in their yards to destroy their driveways and landscaping. These machines are noisy, leave large piles of cuttings and muddy streams of run-off water. The vibrations caused by the machinery can crack foundations and basement walls when drilling near buildings. The depth of vertical bore-holes can penetrate subterranean caverns and the water aquifer. State water control boards have expressed a preference for horizontal instead of vertical ground loops because of the greater threat to drinking water contamination posed by the vertical loop installation. Furthermore, in the case of cavern penetration, well inspectors will require cement trucks to fill a large cavern. Cement is much too expensive to waste on cavern filling. The earth's crust is full of caverns and underground rivers, creating money pits for vertical ground-loop installers.

As with horizontal ground loops, the cost of vertical ground loops is prohibitive. Drilling or trenching equipment is not typically owned by HVAC professionals because it is unique and costs thousands to hundreds of thousands of dollars for one machine. The cost of casing, pipe, fittings, cement, bits, and drill stems required for vertical ground loops can be high. Substantial expense is further incurred in the man-hours required to install the vertical loop system in the bore=holes before they cave-in. During rainy seasons, a sea of mud can fill bore-holes and minute the drill bit is pulled, rendering the bore-holes useless. The large, 6" bore-holes must also be filled with some substance to facilitate the conduction of heat between bore-hole walls and the heat transfer medium-carrying pipe. This substance is a costly one not needed in the instant invention.

Although vertical ground loops have been put in places where prior art horizontal loops have not been feasible, the small yards of many homes have still been off limits to huge drilling equipment. Thus, because of destruction to landscaping and size and weight of water well construction drill rigs, in some rocky soil, vertical ground loops have not been feasible or desired in many cases.

Additionally, vertical ground loops have suffered from design problems, i.e. poor flow distribution, velocity problems and liquid or oil accumulating in the bottom of the vertical ground loops. Moreover, a simple, inexpensive way of preventing flash gas from occurring when supply and return conduits are in the same bore-hole has heretofore been unobtainable.

Also of paramount importance is the superiority of direct-exchange (DX) geothermal heat pump systems over indirect-exchange systems. In indirect-exchange systems (water-source), additional pumps to circulate a liquid other than the refrigerant in an additional indoor heat exchanger results in greater pump horse power being required. An additional heat exchanger is required because the transfer of heat goes from ground to ground-loop liquid (water) to refrigerant to air. In DX systems, however, the heat goes from ground to refrigerant to air, thus eliminating not only a heat exchanger and various pumps, but also the bothersome water and anti-freeze mixture in the ground-loop. Furthermore, the plastic pipe used in prior art water-source ground-loops has been large, cumbersome, crinkled easily, and provided too much resistance when being inserted into bore-holes.

SUMMARY OF THE INVENTION

The negative aspects inherent in the prior art are the dominate factors which economically and environmentally rule out ground source heat pumps as the installation of choice in new structures or to retrofit existing structures. The instant invention overcomes the negative aspects of the prior art by providing a low cost, environmentally friendly geothermal system. Installation of the ground loops of the instant system is micro-surgery compared to prior art installations.

The geothermal heat transfer system comprises a plurality of heat exchange loops placed in the ground at less than a 20 degree angle with the surface of the ground, but greater than a 5 degree angle. Each loop has an out flow line and a return line, and a U-turn juncture at the juncture of the out flow line and return line. The juncture has an inlet in fluid tight communication with the out flow line and an outlet in fluid tight communication with the return line. The inlet means and outlet means are on the same side of the juncture, providing a flow chamber between the inlet and outlet means. The juncture has a tapered leading edge opposite the inlet and outlet.

A distributor member has an inlet at a lower end and a plurality of outlet members at the upper end. The inlet is in fluid tight contact with a return line, ad each of the outlet members are, through the distributor member, in fluid tight engagement with the return line.

A heat exchange device which has heat exchange conduits in a floor, the floor conduits being in heat exchange with heat exchange medium in the return line. The heat exchange medium in the floor conduits flowing through the heat exchange loop.

The installation of the geothermal heat transfer system utilizes a plurality of heat exchange loops offset from a lien parallel to the surface of the earth above he loops. A trench hole is dug and a plurality of bore holes drilled, commencing on one side of the trench hole, passing through the trench hole at a first level, and continuing on the opposite side of the trench hole at a lower level. The bore hole is at an angle ranging from about 5 degrees to less than 25 degrees with a line parallel to the surface of the earth above the bore hole. A pair of conduits are inserted into each drilled bore hole, each of the pair being joined, in fluid tight communication by a juncture member, having a tapered leading edge. The pair of conduits are inserted into the drilled bore hole by forcing the tapered leading edge into the hole. The tapered edge clears the path for the pair of conduits being inserted. Within the trench hole, the inlet lines are connected to a first flow distributor and the outlet conduits are connected to a second distributor.

A liquid-oil-gas separator, having a housing with a top and bottom. An inlet member is mounted in the housing top for delivering a liquid-oil-gas mixture to the separator. An outlet member mounted in the housing top removes accumulated oil from the housing. A deflector plate is mounted parallel to, and spaced from, the top thereby providing a flow path from the interior of the housing, around the deflector plate, and to the outlet member. The inlet member is positioned to deliver liquid-oil-gas mixture to a cup shaped member which is spaced from, and below, the deflector. A fluid flow path is provided from the inlet member toward the cup, between the deflector member and the cup to the outlet member and to the housing interior. Fluid is thereby delivered toward the cup, deflected toward the deflector plate, deflected off of the deflector plate and sprayed in a rain-like pattern toward the bottom of the housing. The liquid-oil-gas separator has at least one oil delivery conduit with an inlet and proximate to, but spaced from, the housing bottom and an outlet end positioned interiorly of the oil delivery conduit. The oil delivery conduit is at least a pair of L-shaped elements extending parallel to the housing bottom and having a plurality of oil inlet holes. The oil delivery conduit outlet end forms a Venturi fluid inlet, and the deflector and cup form a Venturi-member. Whereby a suction force is developed at the oil delivery conduit outlet, siphoning accumulated oil from the housing interior and delivering the oil to the fluid flow stream from the liquid-oil-gas mixture inlet.

The oil is separated from the liquid-oil-gas mixture by delivering a downward stream of a liquid-oil-gas mixture to the interior region of a cup shaped member. This causes the liquid-oil-gas mixture to have its flow directed radially outward and upward off of the cup. The radially outward flow is deflected off of a deflector plate which deflects the flow radially outward and downward off of the deflector plate to the bottom region of the housing. A Venturi suction effect is produced between the cup and the oil tubes. Accumulated oil is siphoned from the housing, through oil tubes which have multiple inlets at the bottom portion of the housing. The oil is delivered to the cup shaped member, by developing a Venturi effect vacuum in the region of the cup. The heavier oil is pulled off deflector plate by suction line pressure in the return pipe.

A bore hole drilling device comprises an elongate hollow drilling bit with a cutting member affixed at one end, a central fluid passage, and connecting means at the other end. The connecting means is preferably a spiral thread. The cutting member is a substantially planar member having a leading cutting tip and presenting a triangular cutting region. A fluid inlet to the central fluid passage is located at the other end from the fluid outlet proximate the first end. The cutting bit has a radial dimension greater than the radial dimension of the elongated hollow drilling bit. The bore hole drilling device further comprises a swivel member with a body portion and a housing element. The housing element has a central bore and a inlet, water line which connects to a water line to the inlet. The body portion is positioned within the central bore and mounted for rotational motion within the housing element. The body portion has an inlet and an outlet. The inlet is a hole through the body portion and is positioned proximate the housing element inlet. The body portion has a central bore hole, a first seal for providing a water tight rotation seal between the body portion and the housing. A second seal means provides a second water tight rotation seal between the body portion and the housing. The housing inlet and body portion inlet are positioned between the first and second seal.

BRIEF DESCRIPTION OF THE DRAWINGS

The advantages of the instant disclosure will become more apparent when read with the specification and the drawings, wherein:

FIG. 8 shows a top view of the 180° U-Bend Elbow;

FIG. 9 is an end view of the pipe entrance end of the U-bend elbow of FIG. 8;

FIG. 10 is an end view of the closed end of the U-bend elbow;

FIG. 11 is a side view of the U-bend elbow;

FIG. 17 shows the optional U-bend assembly of a concentric water-source ground-loop.

DETAILED DESCRIPTION OF THE INVENTION

The instant device overcomes the prior art deficiencies by providing a direct-exchange ground-source heat pump that is easy and inexpensive to install without destruction to the environment.

The installation method of ground-source heat pump causes virtually no damage to the environment or existing structures. No large excavations are required as the horizontally oriented bore-holes are extremely small. The small bore-holes do not bother subterranean caverns, water aquifers, grass, trees, shrubs or any landscape vegetation. Structures and paved surfaces also remain free from damage. Due to the bore-hole size, a waiting period between installation and construction to allow the earth to settle is not required. The equipment used in the installation is handheld and affordable. As the equipment is powered by electricity, there are no fossil fuels to be spilled or burned to pollute the environment. Further, as installation does not require the moving of mass amount of land, polluted run-off from the large excavation of the prior art are eliminated. The disclosure achieves EPA and DOE projected goals for geothermal technology to clean up the environment and significantly reduce the over-use of fossil fuels.

In geothermal heat-pump systems, the exchange of heat takes place between the earth and medium-carrying conduits that are placed horizontally or vertically in the ground. Heat exchange can be either direct or indirect, however, direct exchanged geothermal heat pump systems provide a superiority over the indirect systems. The use of direct heat exchange eliminates the need for extra pump horse power to pump an extra liquid, as required in indirect systems such as water-source ground loops. An additional heat exchanger is also eliminated since the transfer of heat goes from ground to refrigerant to air. This eliminates not only an heat exchanger and various pumps, but also the dangerous water and anti-freeze mixture required in indirect exchange ground loops. Additionally, the transfer of heat to the air in a building utilizing a heat pump can be simultaneously transferred by the same heat pump system to the domestic hot water used in the building. The instant invention provides the additional benefits of on-demand domestic hot water production, and air dehumidification. Further, the instant invention can readily be used with radiant floors. Because typical basements have cold, damp, concrete floors, the use of radiant floors provides a comfort level unparalleled in basements. A radiant floor system takes the chill from the floor as well as removing dampness.

Figure 1:
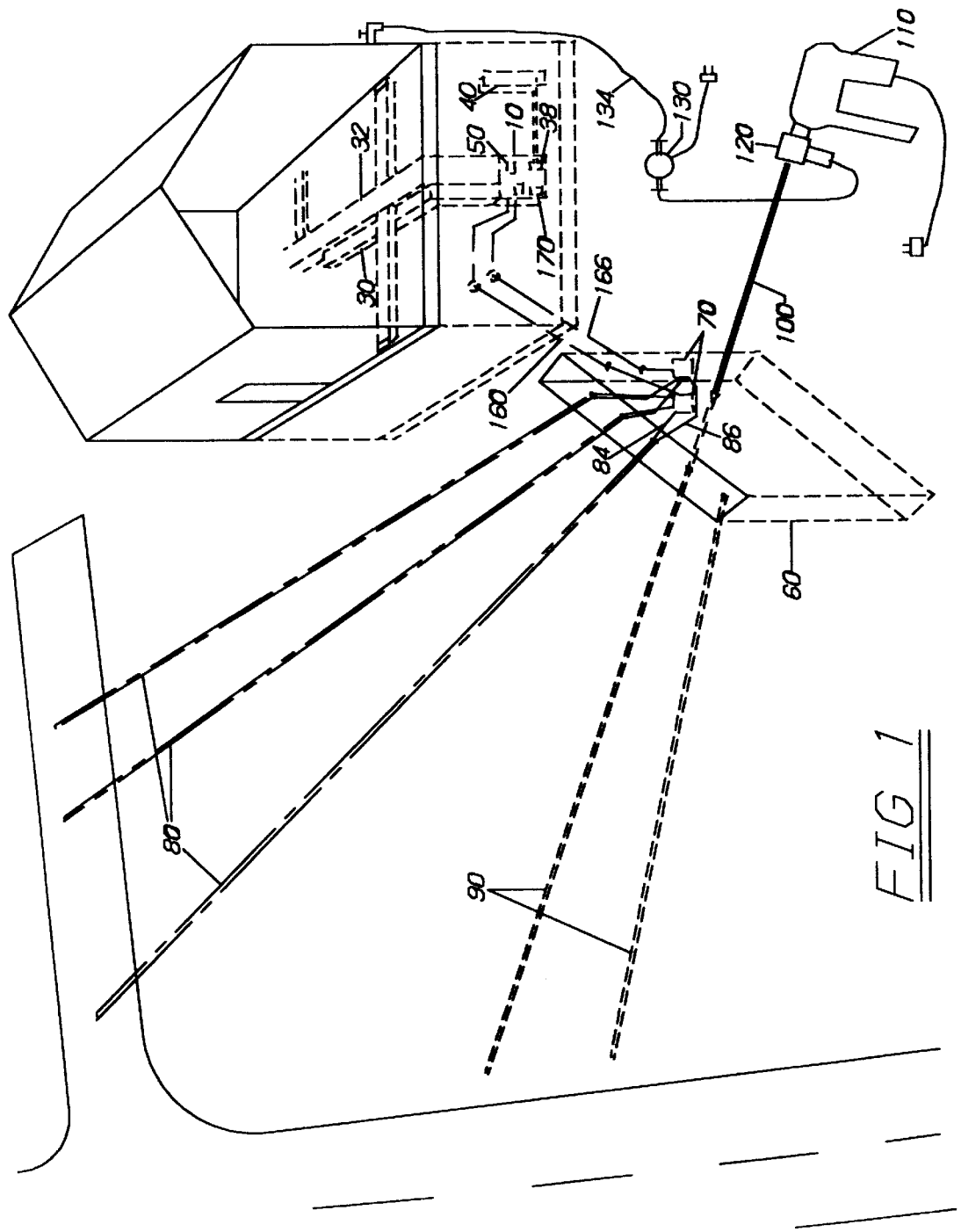
FIG. 1 is a schematic illustration of a site plan for the installation of the geothermal heating and air conditioning system of the instant invention.

In FIG. 1 a heat pump 10, illustrated in detail in FIG. 16, is connected to a supply air duct 32 and a return air duct 30. The heat pump 10 is in heat transfer connection with a domestic hot water heater 40 by way of a de-super heater 38, using standard water pipes 252 and 254. The compressor 50 compresses the vaporized heat transfer medium (R-22 or other refrigerant known in the art) producing a very hot gas, and causes the hot gas to flow out through transfer line 160 into the flow divider 70. Although the heat transfer medium is referred to herein as R-22, water or freon, it should be noted that any medium applicable to the system as taught herein can be used. Depending upon the size of the system, one or more pair of flow dividers 70 are installed in the header ditch 60 to disperse the medium to the ground loops 80. One of each pair of flow dividers 70 is used to divide the flow from the building through transfer line 160 equally among the plurality of ground loops 80. The return flow is combined in the second flow divider 70 of the pair and returned to the house via conduit 166. Since the flow direction reverses between the heating and cooling cycles, the flow dividers 70 are used in pairs so that the flow to the ground loops 80 is always uniformly distributed from the single line to the plurality lines by means of the flow dividers 70. The flow dividers 70 discharge upwardly for laminar flow of gas and liquid to "U"-bend assemblies 80, in order to provide equal, uniform distribution to each assembly 80. The U-bend assemblies 80 are placed in bore-holes 90 drilled by carbide-tipped bits/stems 100. The number of bore-holes 90 is determined by the size of the structure and heating system. The bore-holes 90 used in conjunction with the ½ inch conduit would be about ⅞ inch. The bits 100 are manufactured to be used in conjunction with a hand-held air- or electric-powered power drill 110, earth drill water swivel 120, and booster pump 130. The drill 110 can be a standard 500 to 1000 rpm, 110-volt, ½ horse power drill. The booster pump 130 should have the capacity to deliver approximately 15 psi at 3 gal. per min. and is connected to the water supply through use of a standard hose 134.

Bore holes 90 are two or three feet deep at the header ditch 60 descending to approximately eight to eighteen feed deep. The bore holes 90 generally extend for twenty to eighty-feed, depending on geology encountered. The angle of the bore hole with respect to a horizon is generally in the range from about 5 to about 15 degrees. Although steeper angles can be used, the shallow angle of 5 to 15 degrees is preferred. To start the bore-holes 90, the drill operator simply walks horizontally along the terrain. The drill bits flex the small angle of decent. However, the first ten feed of bore-hole must be straight. While spinning at 800 rpm or so, the bit will remain straight.

Figure 12:
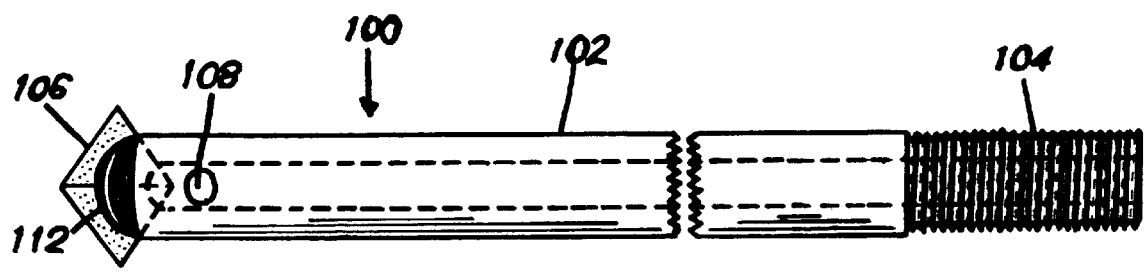
FIG. 12 is a side view of the drill bit and stem of the instant invention.
Figure 13:
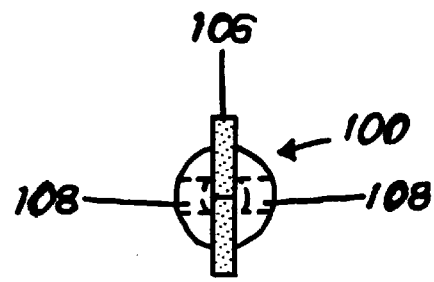
FIG. 13 is an end view of the bit-end of the drill bit and stem.

The pump 130 pumps water through steel drill stems 100, illustrated in further detail in FIGS. 12 and 13. The drill stems 100 are welded or threaded together in multiple lengths of 20', 40', 60', and 80'. The drill stems 100 are threaded to the earth drill water swivel 120 in order to drill the bore holes 90. Preferably three 200 foot passes of U-bend assembly containing R-22 are provided per ton of building air conditioning load requirement. The length of passes will vary according to geology encountered in that rock yields excellent heat transfer, clay good transfer and sand average heat transfer. An examination of the cuttings coming out of the bore-holes during the drilling process will help determine the need to increase or decrease the number of U-bend assembly passes. House water 134 will assist the drilling procedure by carrying drill cuttings from the bore hole annulus to the header ditch 60. The header ditch 60 should be excavated to a depth of 5' or more to accommodate excess water and drill cuttings, where they settle and remain. U-bend assemblies 80 can be made on the job site to accommodate the size and length of the multiple bore-holes. The number of bore holes is further determined by the number of equal length passes that hydraulically balance every laminar flow divider pass from discharge lien supply and liquid line return. Properly sized and insulated liquid lines 166 and discharge lines 160 that feed the supply and return laminar flow dividers are then drilled into the house from the header ditch 60. The feeder lines 166 and 160 continue the flow of either earth-cooled, or earth-heated, R-22 to and from the heat pump 10.

Figure 16A:
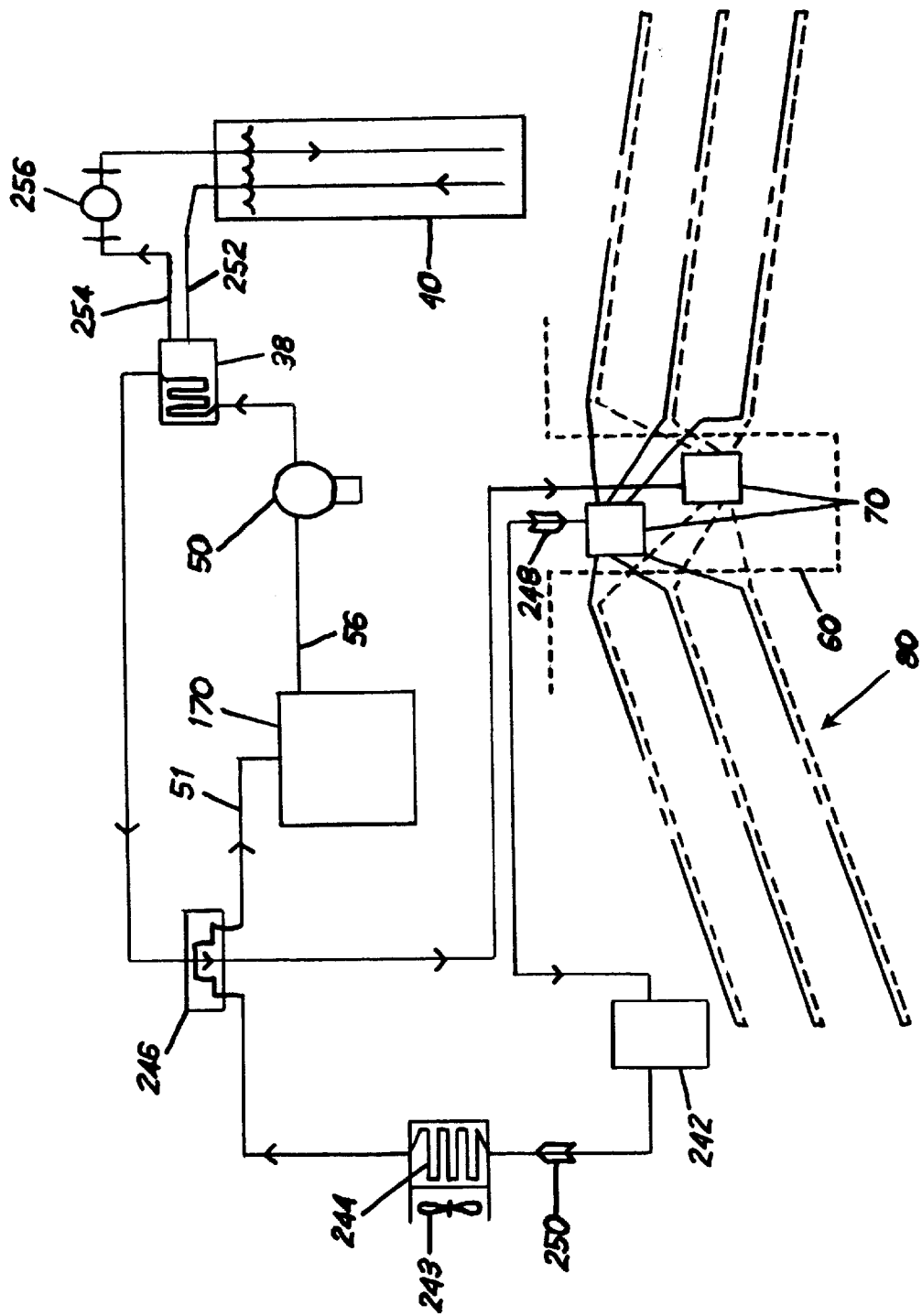
FIG. 16a is a schematic illustration of the heat exchange system in the air conditioning cycle.

While in the air conditioning cycle (AC), as illustrated in FIG. 16A, the refrigerant in the ground loop 80 flows to the incoming laminar flow divider 70 located in the header ditch 60. The refrigerant then travels to a flow control piston 248, to the correct charge control system 242, and to another flow control piston 250. From the second flow control piston 250, the refrigerant goes to the coil 244 where the fan 243 moves building air across the R-22 chilled evaporator coil 244. The refrigerant moves to the reversing valve 246, on to the liquid-oil-gas separator 170 to the compressor 50 and the de-super heater 38. The heat from the de-super heater 38 can be diverted for use in a domestic hot water heater 40 by means of piping 252 and 254. A pump 256 draws the heated water from the de-super heater 38 to the hot water heater 40. The water is returned to the de-super heater 38 through return pipe 252. The refrigerant repeats the trip through the reversing value 246 to be returned to laminar flow divider 70 and on to the ground loop 80 once again. In the heating cycle the flow is reversed by the building's thermostat season selector switch that controls the reversing valve 246.

Figure 16B:
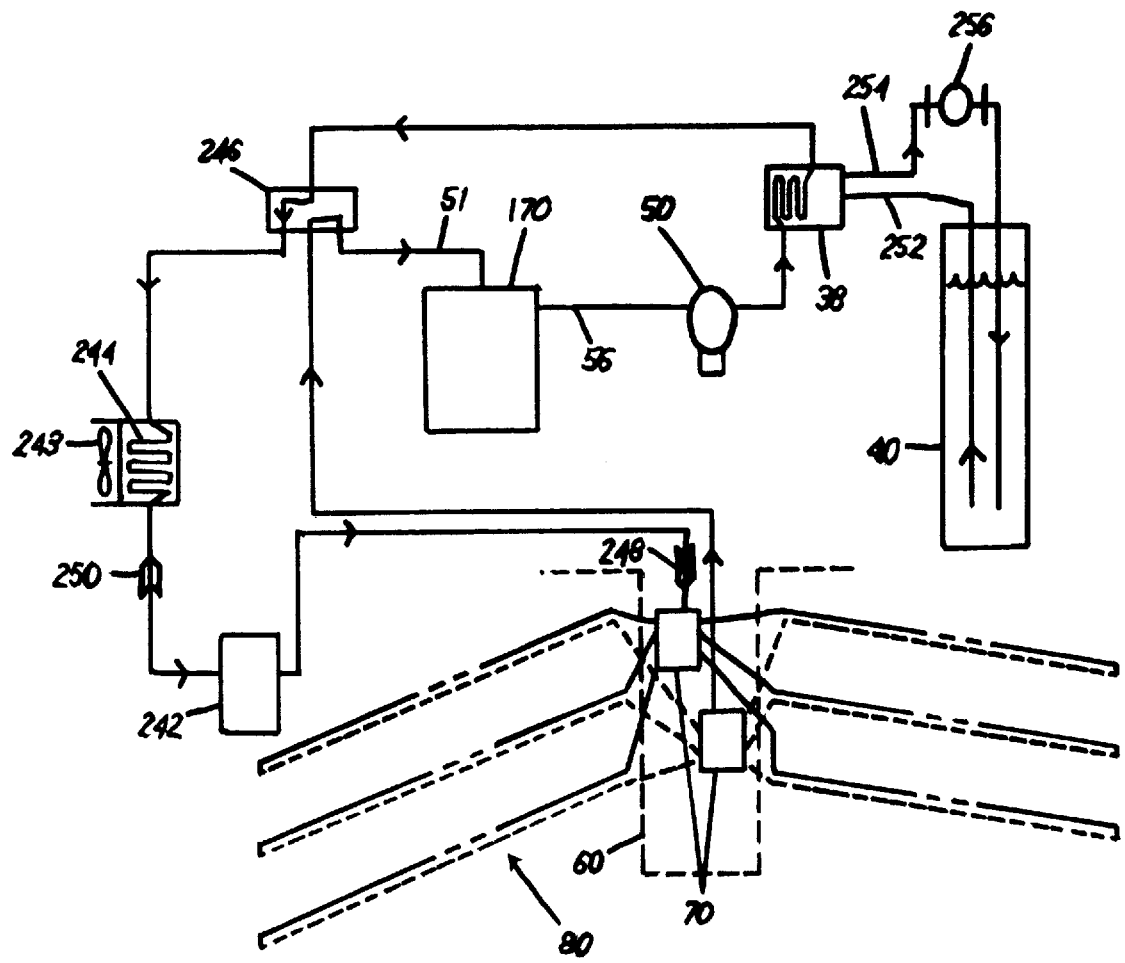
FIG. 16b is a schematic illustration of the heat exchange system in the heating cycle.

Reversing the direction of the reversing valve 246 creates the heating cycle, as shown in FIG. 16B. The flow control piston 248 moves to the orifice restriction position, and flow control piston 250 to full flow non-restricting position. The correct charge control system 242 is influenced to feed back pressure and causes the R-22 refrigerant to expand flash gas. This flash gas creates a large threshold of heat exchange medium in the evaporator. Where the correct charge control system (CCCS) is electronically censored, the flow pistons are used in conjunction with the correct charge control system, however, if a hydraulic expansion device is build into the CCCS or other means known in the art are utilized, the flow pistons are not required.

In the heating cycle, FIG. 16B, the heat transfer medium is heated in the ground loops 80, and then in the compressor 50. Heat is removed in the de-super heater 38 and then in the building air heat exchanger 244, before returning to the ground loops 80, for reheating.

Figure 2:
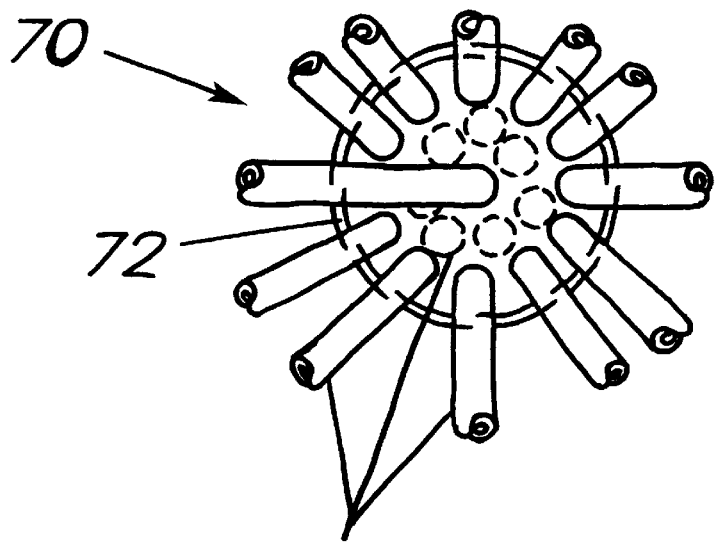
FIG. 2 is a top view of the laminar flow divider used with the instant invention.
Figure 3:
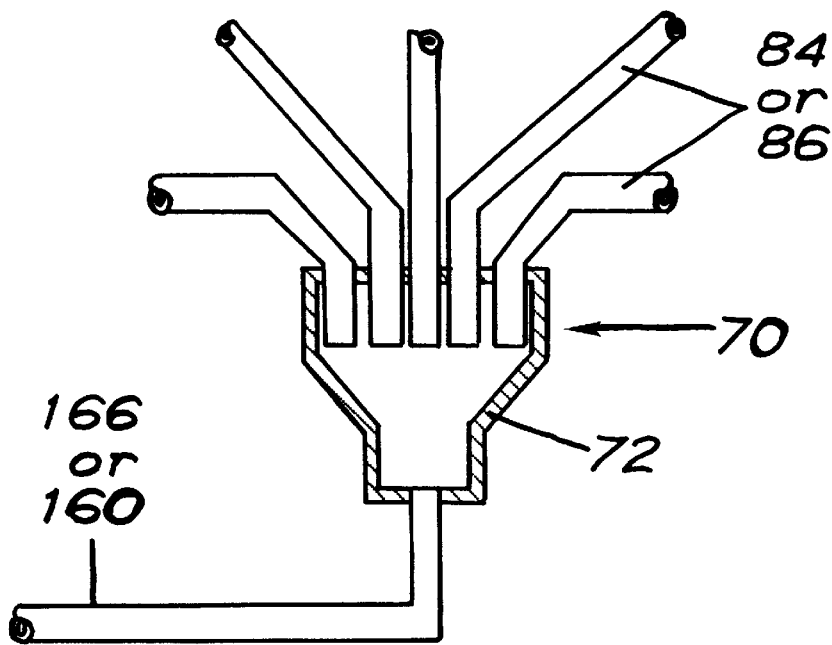
FIG. 3 is a side view of the laminar flow divider of FIG. 2.

FIGS. 2 and 3 show the laminar flow dividers 70 that serve to equally divide the refrigerant received from the feeder lines 166 and 160 into the proper number of conduits 84 found in the ground loops 80. For ease of description, the flow divider 70 connected to the feeder line 160 will be referred to as the outgoing divider 70 and while the divider 70 receiving the feeder line 166 will be referred to as the incoming divider 70. As stated heretofore, the laminar flow dividers are installed in pairs, one to connect the conduit 84 of the ground loops 80 to the feeder line 160 and the other to connect the conduit 86 of the ground loops 80 to the feeder line 166. The laminar flow divider 70 has a body 72 which receives either the feeder lines 160 and 166. The body 72 of the laminar flow divider 70 is dimensioned to receive the conduits 84 and 86. The refrigerant travels out conduit 84 and return through conduit 86 of the ground loop 80. The return conduit 86 is connected to incoming divider 70 which converges the conduits 86 into one return feeder line 166. It should be noted that depending upon whether the system is in the heat or air conditioning mode will determine which of the feeder lines 160 or 166, as well as flow dividers 70, is the outgoing and which is the incoming.

Figure 4:
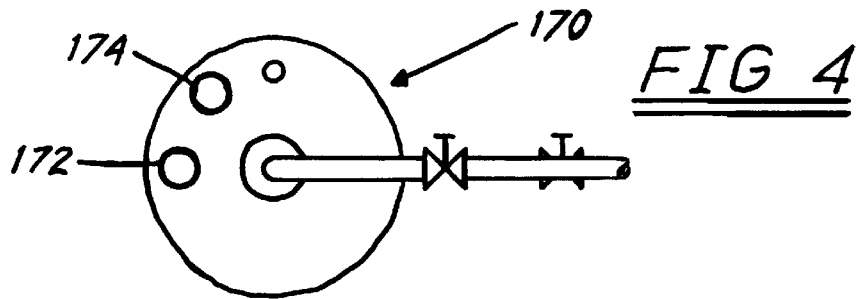
FIG. 4 is a top view of the liquid-oil-gas separator of the instant invention.
Figure 5:
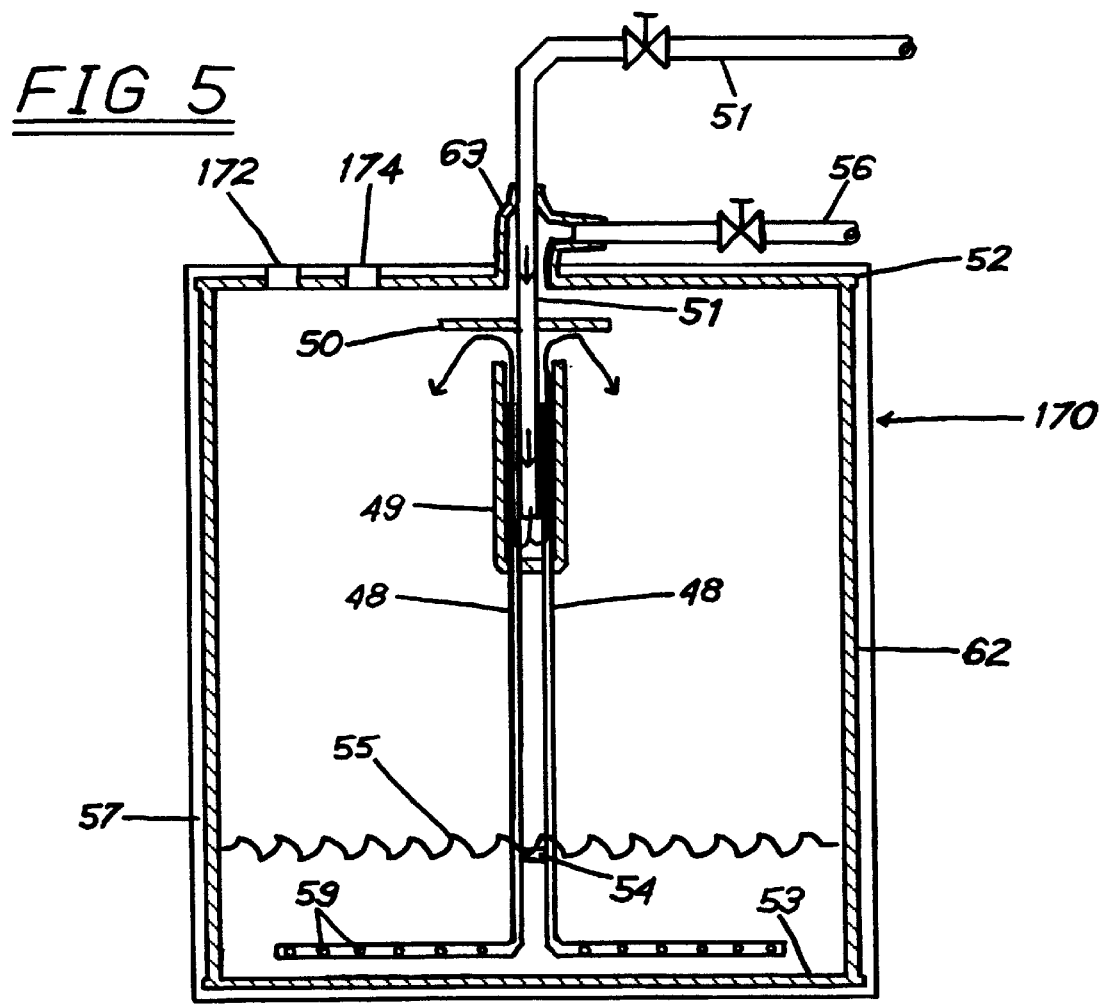
FIG. 5 is a side view of the liquid-oil-gas separator of FIG. 4.
Figure 5A:
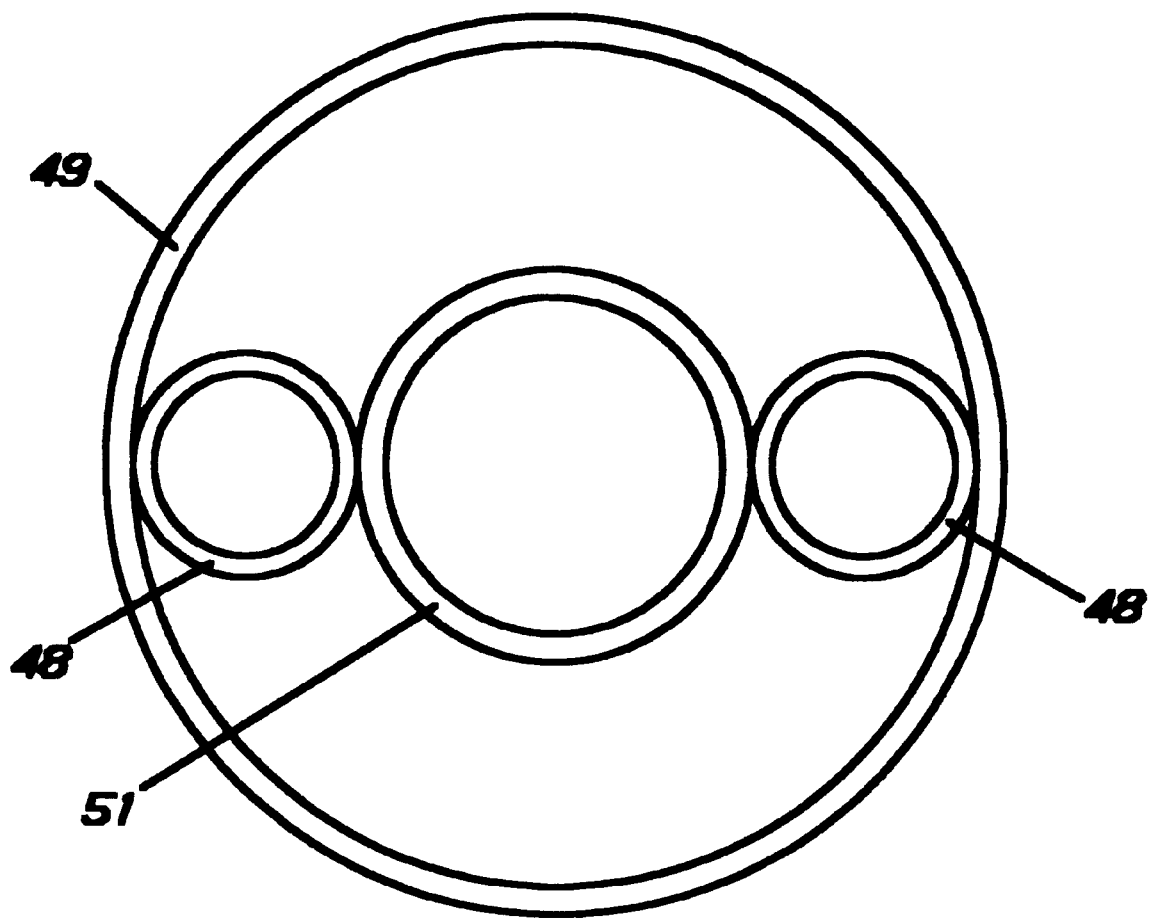
FIG. 5A is a top view of the cup and piping of the liquid-oil-gas separator of FIG. 5.

FIGS. 4, 5 and 5A show the liquid-oil-gas separator 170 which separates the refrigerant into its various states, allows oil to return to the compressor and keeps liquid refrigerant from damaging the compressor. The separator 170 provides dual sight glasses 172 and 174 to allow for visual liquid level charge adjustment verification. The dual sight glasses 172 and 174 provide the advantage that the HVAC specialist can peer through sight glass 172 while shining a flash light into the other sight glass 174.

The liquid-oil-gas separator (LOGS) will separate oil from the freon, returning the oil to the compressor. A major problem with refrigerant compressors is the migration of oil from the compressor and the resultant failure of the compressor. The separator 170, as illustrated in FIG. 5, is a cylindrical unit having an outer cylinder 62, a cylinder top 52 and cylinder base 53. The inflow pipe 51 is secured to the reducing T 63 and receives the liquid-oil-gas mixture. The inflow pipe 51 extends into the cylinder 62 approximately one quarter the length of the cylinder 62. Two holes are drilled into the bottom of the cup 49 and dimensioned to receive the two L-shaped tubes 48. Since the tubes 48 are subsequently secured to the inflow pipe 51, the distance between the tubes 48 is equal to the diameter of the inflow pipe 51. It is preferable that the interior dimensions of the cup 49 be equal to the diameter of the inflow pipe 51 plus the diameter of the two tubes 48. The tubes 48 are preferably secured to cup 49 approximately 1 inch below the upper edge of the lip. The tubes 48 and cup 49 are oriented so as to be suspended approximately ½ inch above the interior LOGS base 53. The horizontal legs of the tubes 48 have multiple holes 59 drilled along their length. A deflector plate 50 is secured to the inflow pipe 51 to direct the mixture received from the input pipe 51 to the bottom of the cylinder 62. The cup 49, as illustrated, is approximately four inches long, extending to within about one inch from the deflector plate 50. The deflector 50 is spaced about 5/16" from the upper edge of lip of the cup 49. The tube separator 54 is attached to the tubes 48 approximately 2½ inches from the cylinder base 53. The tube separator 54 serves to establish the lower limit of the liquid freon 55 and therefore should be positioned so that a sight glass view the separator 54 and the liquid freon level 55 reveals an average charge, or acceptable level. The maximum level of the freon 55 can be seen through sight glasses 172 and 174 when using a flash light and must not exceed a running level which is above the top of the cup 49.

Freon flows into the LOGS separator 170 through the tube 51 and is deflected by the base of the cup toward the deflector 50. A "VENTURI" suction is produced by the fluid flow past the outlet of the tubes 48. The suction draws oil which accumulates at the bottom of the cylinder 62, through the holes 59 in the legs of the L-shaped tubes 48 into the stream of flow of freon from the tube 51. The oil and freon gas is drawn into the compressor return line 56 and returned to the compressor, while the liquid freon 55 rains down off of the deflector plate 50.

The oil is atomized so that it can become entrained in the combination liquid, gas and oil flow stream to outlet pipe 56.

The rain like stream of liquid does not obstruct the ability to view the top of the accumulated liquid 55 thereby enabling a user to determine the level of the freon. The R-22 liquid being lighter than oil rains to bottom of the LOGS cylinder 62 to be accumulated there in reserve. The LOGS cylinder 62 is preferably thermally insulated 57, through any applicable method known in the art. Reducing tee 63 is welded to cylinder top 52 slightly off center so as to allow 3" spacing of two sight glasses 172 and 174. The level of liquid will vary between the air conditioning cycle and the heating cycle and is monitored through the windows 172 and 174.

Figure 6:
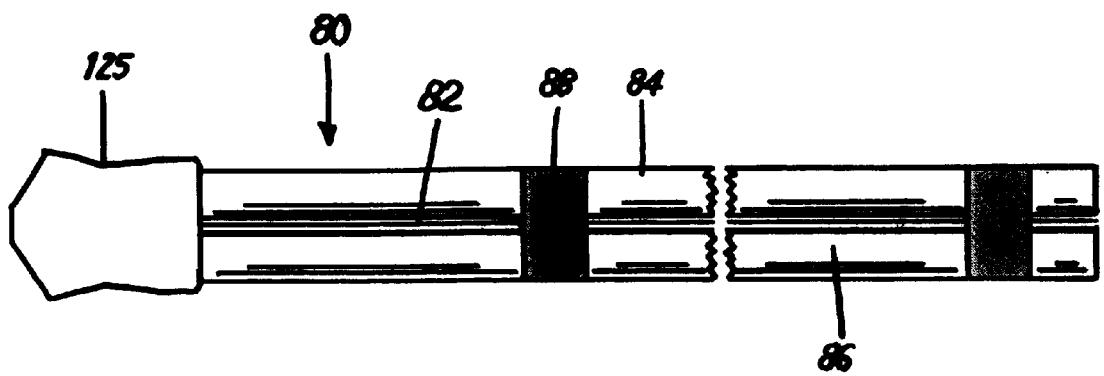
FIG. 6 shows a top view of the U-bend assembly of the instant invention.
Figure 7:
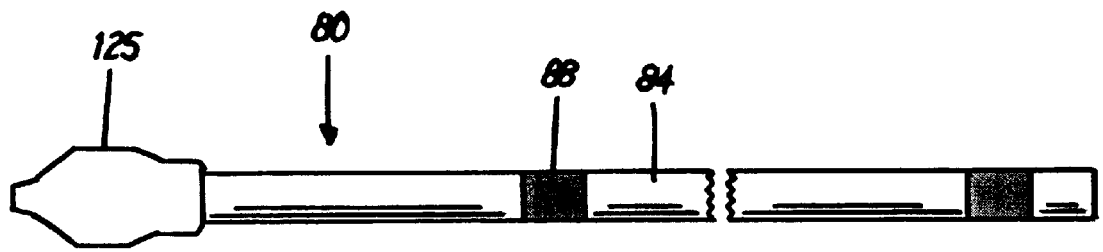
FIG. 7 shows a side view of the U-bend assembly of FIG. 6.

FIGS. 6 and 7 show the U-bend assembly 80 that is placed into the ground and used to transport the refrigerant. The ends of the conduits 84 and 86 then are placed into the 180° U-bend elbow 125. A strip of insulation material 82, such as cut from a rubber under-ground soaker hose, is placed between the two pieces of conduit 84 and 86. The insulation material 82 and conduits 84 and 86 are maintained in position by securing the combination, by, for example, being wrapped in moisture resistant tape 88.

FIGS. 8, 9, 10 and 11 illustrate in more detail the 180° U-bend elbow 125. The elbow 125 is made from a section of conduit having a diameter sufficient to accommodate the conduits 84 and 86. One end 126 of the elbow 125 is crimped closed. The preferred length of the elbow 125 when used in combination with ¼ inch tubing, is approximately one-and-a-half-inches long with a ½ inch diameter. The crimped end 126 must be sealed to prevent the escape of refrigerant which can be achieved through use of solder, or other means known in the art. As can be seen in FIG. 11, the crimped end 126 forms a modified V-shape which allows for easier insertion into the bore holes 90. It has been found that the taper of the V-shaped end 126 permits the length of conduit to be passed through a relatively small diameter hole without binding. It is noted that the greater the diameter of the bore hole the easier it is to pass long lengths of conduits without binding. However, the ability to bore long holes is inversely related to the diameter of the hole being bored. Thus, the use of the taper provides an advantageous balance between bore hole diameter and pipe diameter, thus maximizing the ease of boring a hole (by enabling a small diameter hole to be used) and maximizing the length of conduit which can be inserted into the relatively small diameter hole. The conduits 84 and 86 are inserted into the open end of the elbow 125, crimped and sealed. The conduits 84 and 86 are prevented from sliding to the crimped end 126 by the deformation created during the crimping of the end 126. The "space" 128 allows for the refrigerant to travel from conduit 84 to conduit 86 for the return trip. The diameters of conduits 84 and 86 as well as the elbow 125 are gauged to reflect the required flow rates and heat exchange results between the earth and heat pump.

FIGS. 12 and 13 show the drill bit and stem 100. The stem 102 has a threaded end 104 which is dimensioned to interact with the water swivel 120. The stem 102 is manufactured from a standard water pipe, preferably schedule 80, with a diameter greater than that of the U-bend assembly 80. The bit receiving end 112 is closed and rounded. A groove can be cut into the stem 102 to receive carbide bit 106. The carbide bit 106 is soldered, or otherwise secured, to the bit receiving area 112. Two water ports 108 are drilled into the stem 102 to allow the water coming down the stem 102 to exit into the bore-hole 9. Using the dimensions disclosed herein, the water ports are approximately 3/16 inch in diameter. Water serves to cool the bit and stem 100, carry cuttings to the header ditch 60 and generally facilitate the drilling process. When using the foregoing with water-source concentric conduits rather than direct exchange, the diameters and length may require increasing.

Figure 14:
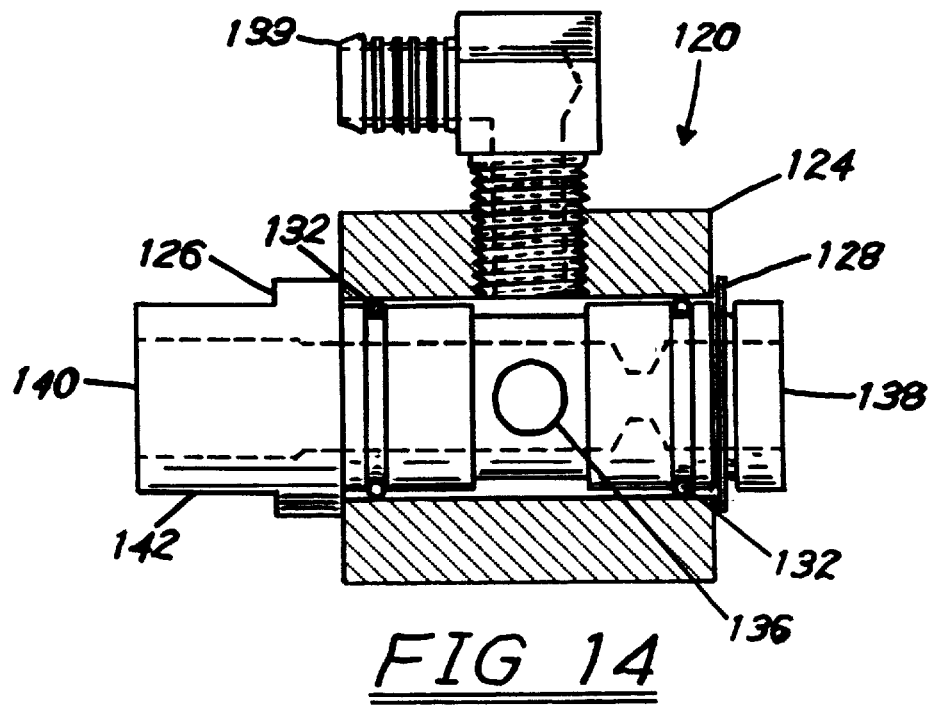
FIG. 14 is a cross-sectional side view of the earth drill water swivel assembly.
Figure 15:
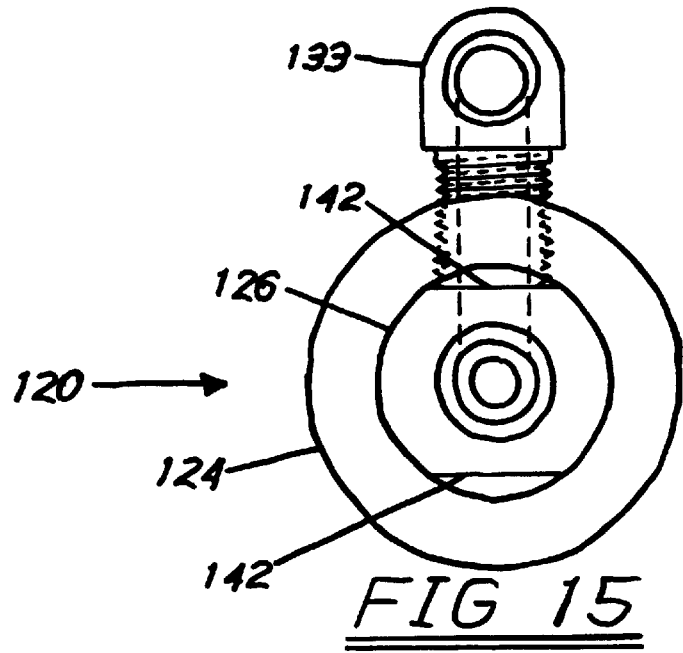
FIG. 15 an end view of the earth drill water swivel assembly.

FIGS. 14 and 15 show the earth drill water swivel 120. Water from the booster pump 130 enters the swivel 120 at fitting 133. For ease of manufacture, the fitting 133 is preferably a standard fitting which will connect to a ½ inch garden hose, although special fittings can be used to allow for specialized applications. Water then travels through a ring 124, which is held in place over the core 126 by a snap ring 128, or other means known in the art. It is preferable that the ring 124 be a brass donut commonly used in the art, however alternative rings can be used which provide the same advantages. Two "O"-rings 132 keep water from escaping between the ring 124 and the spinning core 16. Water enters the hollow center of the core 126 by way of a water port 136 and exits the core through the stem port 138. The stem port 138 is threaded to receive the threaded end 104 of the drill bit and stem 100. The drill connector 140 is threaded to attach to the electric drill 110 with the aid of wrench flats 142. The rotation of the electric drill 110 causes the core 126 to rotate within the ring 124, thereby rotating the drill bit and stem 100.

FIG. 17 illustrates a counter-current heat exchange system for use as a ground loops heat exchanger. Fluid flow can enter conduit 505 which is relatively rigid copper tube having a plurality of outlet ports 506. The flow then returns, countercurrent to the inlet flow. The flow in the region between the outer tube 504 and the inner conduit 505 is in heat exchange with the ground for heating of the fluid in the winter and the cooling of the fluid in the summer. The outer tube is preferably, a lay flat irrigation tube. Preferably, the tube is of polyethylene, but can be of other flexible, high durability material. The inner copper tube provides the rigidity for the insertion of long length of conduit. The end of the conduit 505 can be closed off by means of a conventional end cap 507 which is soldered in place, or a threaded end cap. The polyethylene tube 504 is clamped to the capped end of the copper conduit by any of the known clamping mechanisms, such as hose clamps. Clamping of the conduit 504 to the copper T 502 can be by the same means as the clamping at the capped end.

A copper "T" 502 provides the closure at the end opposite the capped end. The copper T 502 is soldered to the copper tube 505 to provide a fluid tight seal, at 512. Similarly, the copper T is solder connected to another copper pipe 501, as well known in the art. The counter-current heat exchange conduits can be advantageously used with heat exchange fluids, such as water-anti-freeze mixtures. Since the outer tube 504 is collapsed during the installation process, there can be substantial clearance between the tube 504 and the wall of the bore hole into which it is being inserted. Filling the conduits with fluid inflates the conduit 504 and brings its outer surface into heat exchange contact with the earth. The force of the inflation of the conduit can compact the surrounding earth. Therefore the expanded diameter of the conduit 504 can exceed the diameter of the receiving hole, as bored, depending on the type or condition of the earth.

The heating system can be advantageously used in conjunction with radiant floor heat exchange coils in concrete floor. Air from the forced air duct system 430 and 432 shown in FIG. 18 will provide for the flow of sufficient air to remove the chill from a 6" insulated concrete floor slab using 2"×3" aluminum rectangular 0.029 conduit 460. Conduit 461 is a supply line and 462 is return flexible 6" duct. Shut off dampers 463 control the air flow with the aid of the room's wall thermostat. The concrete floor can have approximately 1" of load bearing styrofoam insulation underneath. Alternatively, ¾ inch polybutalene water pipes can be embedded in the concrete. A circulator pump from the domestic hot water heater and a wall thermostat can be used to control the flow relative to the temperature of the room. The same radiant floor concept can be used in rooms such as kitchens and bathrooms where bare feet often touch the floor. The pipes are simply attached to the sub-floor materials and then insulated underneath.

Figure 18:
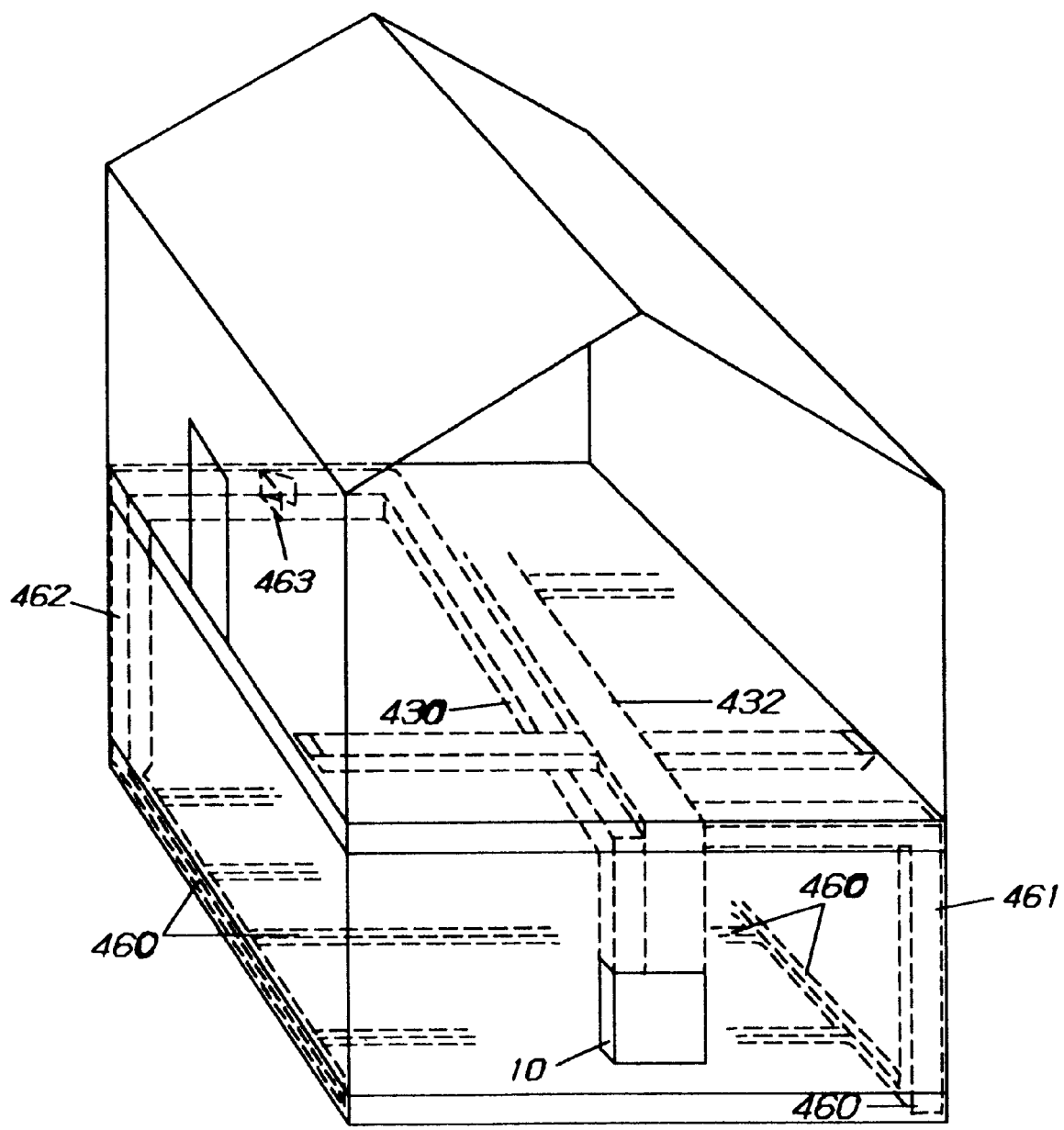
FIG. 18 shows optional duct work for a radiant floor addition to the instant heat pump.

The instant invention will also work with existing art water source ground loops by drilling bore-holes of approximately two inches in diameter and inserting a copper supply water tube into a return conduit made of flexible irrigation plastic polyethylene as shown in FIG. 18. After inserted into the bore-hole the outer conduit is inflated inside the bore-hole by 12 psi water pressure. A "U"-bend at the end of the concentric conduits acts as a 180° elbow. It should be noted that a water-source ground-lop requires about twice as much underground piping as does direct exchange ground loop.

As can be seen from the foregoing, through the use of this invention, the installation of ground loops no longer requires the use of big, heavy, expensive equipment and specialized personnel to perform very time-consuming drilling, excavating of trenches, and installation. The small, inexpensive equipment required in this invention can easily be or may already be owned by many HVAC installers and contractors. Moreover, the man-hours heretofore required have been greatly reduced. Drilling equipment is effective, common, clean, small, inexpensive, and uses very little energy. Deep, dangerous ditches for the laying of pipes are not needed. Pipes and fittings are simple and quickly prepared. The land that has had the ground loop is this invention installed is immediately available for landscaping work, parking installation, or what ever is typically needed in residential or commercial areas. This high speed factor of the installation process renders the system extremely cost effective for modern contractors and HVAC specialists. Furthermore, virtually no dust is created for wind to carry to undesirable places (i.e. indoor surfaces, wet paint and caulk, lungs, eyes, etc.). The established neighboring inhabitants and their possessions remain unaffected.

Few home or building owners have land that is too restrictive for the installation of the geothermal ground loop system of this invention. Even the smaller lots of modern buildings such as town houses, condominiums, apartments, commercial buildings, etc. provide the necessary land area for this invention. Owners of existing buildings wishing to change to geothermal heating systems can now have geothermal heating and cooling and domestic hot water without disturbing their existing structures, landscaping, wooded areas or neighbors. Moreover, building owners having rocky land can greatly benefit from this invention because as the small size of the bore-holes and the characteristics of the special drilling equipment allows for drilling in rock.

By virtue of the bore-holes having a near-horizontal orientation, water aquifers and underground caverns will not be penetrated. Therefore there is no fear of drinking water contamination and underground caverns will not have to be filled with expensive cement.

The small copper conduit preferably used in this invention is the ideal choice for ground loops. The copper conduit is common, affordable, easily handled, and enduring, as illustrated by 5000 year old copper found buried in Egypt. Additionally, copper tubing slips easily into bore-holes when fitted with the special 180° "U"-bend elbow fitting. The close tolerance bore-hole used herein has sufficient wet mud to lubricate and grout the U-bend assembly. When connections are made using solder, it is critical that the solder be able to resist corrosion. A solder containing 60% silver provides the required strength while preventing corrosion.

This invention overcomes the costly, defective design problems of the direct-exchange (DX) systems of the prior art. While vertical ground-loops have suffered from poor laminar flow distribution and velocity problems, the ground loops of this invention are not vertical in orientation and do not have these problems.

The foregoing identified superior aspects of this invention makes it the most environmentally responsible and cost saving heat pump commercially available and brings geothermal heat and cooling well within the reach of the average homeowner and well within the skill and financial limitations of the average contractor and HVAC specialist. The DX heat pump disclosed above is affordable for homeowners and profitable for contractors and HVAC installers. The ability to eliminate the use of a $250,000 drilling rig and $150,000 excavating equipment enables environmentally friendly geothermal heating systems to be made available to a much wider range of consumers. General contractors will be willing to install geothermal heat pumps since the instant system will no longer disrupt and delay the building process. Even when altered to apply to water-source ground-loop installations, which takes twice the amount of bore-hole and land than the preferred embodiment, the instant method is still micro surgery compared to prior art methods.

The foregoing dimensions are used in way of example only. In instances obvious to those skilled in the art, the dimensions may require alterations. Other materials which will meet the criteria set forth herein can be substituted.

What is claimed is:

1. A bore hole drilling device for drilling substantially horizontal bore holes comprising,
    (a) a power drill,
    (b) a cylindrical, elongated hollow drilling stem, the stem comprising:
        a closed first end and a cylindrical open second end, provided the stem is other than hexagonal,
        connecting means at the open second end,
        a central liquid passage, the central liquid passage being open to, and extending from, the open second end to the closed first end, and
        at least one liquid outlet along the central liquid passage proximate the first end, and
    (c) an angular cutting member, the cutting member having at least three angles, two of the angles opposing one another,
        the cutting member being affixed within the first end of the stem, proximate the opposing angles,
        the cutting member being substantially planar member having a third angle leading as a cutting tip,
        the cutting member presenting a cutting region having a periphery substantially greater than the closed first end,
    wherein liquid enters the central liquid passage through the open second end and exits the liquid passage through the at least one liquid outlet, the liquid cooling the drilling stem.

2. A device according to claim 1, wherein the connecting means is a spiral thread.

3. A device according to claim 1, wherein the closed first end of the stem is a rounded closed first end.

4. A device according to claim 1, further comprising a water delivery system, for delivering water to the interior of the hollow drilling stem, the water delivery system including a swivel member, the swivel member having a body portion and a housing element, the housing element having a central bore and a inlet, water line connecting means for connecting a water line to the inlet, the body portion being positioned within the central bore and mounted for rotational motion within the housing element, the body portion having an inlet and an outlet, the inlet being a hole through the body portion and positioned proximate the housing element inlet, the body portion having a central bore hole, a first seal means for providing a first water tight rotational seal between the body portion and the housing and a second seal means for providing a second water tight rotational seal between the body portion and the housing, the housing inlet and the body portion inlet being positioned between the first seal and the second seal.

5. A device according to claim 1, further comprising a swivel member, the swivel member having a body portion and a housing element, the housing element having a central bore and a inlet, water line connecting means for connecting a water line to the inlet, the body portion being position within the central bore and mounted for rotational motion within the housing element, the body portion having an inlet and an outlet, the outlet being in liquid engagement with the bore hole drilling device liquid inlet, the swivel member liquid inlet being a hole through the body portion and positioned proximate the housing element inlet, the body portion having a central bore hole, a first seal means for providing a first water tight rotation seal between the body portion and the housing and a second seal means for providing a second water tight rotation seal between the body portion and the housing, the housing inlet and the body portion inlet being positioned between the first seal and the second seal.

6. A bore hole drilling device for drilling substantially horizontal bore holes comprising,
   (a) a power drill,
   (b) a cylindrical, elongated hollow drilling stem, the stem comprising:
      a rounded closed first end and a cylindrical open second end, provided the stem is other than hexagonal,
      connecting means at the open second end,
      a central liquid passage, the central liquid passage open to, and extending from, the open second end to the closed first end, and
      at least one liquid outlet along the central liquid passage proximate the first end,
   (c) an angular cutting member, the cutting member having at least three angles, two of the angles opposing one another,
      the cutting member being affixed within the first end of the stem, proximate the opposing angles,
      the cutting member being substantially planar member having a third angle leading as a cutting tip,
      the cutting member presenting a cutting region having a periphery substantially greater than the closed first end,
   (d) a swivel member, comprising:
      (d1) a housing element, the housing element having a central bore and a housing inlet with liquid connecting means,
      (d2) a body portion, the body portion being rotationally positioned within the central bore, the body portion having
         a central channel,
         an outlet, the outlet being in liquid engagement with the drilling stem central liquid passage,
         a liquid inlet, the liquid inlet being a hole through the body portion to the central channel and positioned proximate the housing inlet,
      (d3) a first seal member for providing a first water tight rotation seal between the body portion and the housing and
      (d4) a second seal member for providing a second water tight rotation seal between the body portion and the housing, the housing inlet and the body portion inlet being positioned between the first seal and the second seal,
   wherein a liquid source is connected to the swivel member inlet enabling liquid to enter the central liquid passage through the open second end and the liquid exits the central liquid passage through the at least one liquid outlet, the liquid cooling the drilling stem.

7. A method of drilling a substantially horizontal bore hole using a drilling device, the drilling device comprising,
   (a) a power drill,
   (b) a cylindrical, elongated hollow drilling stem, the stem comprising:
      a rounded closed first end and a cylindrical open second end, provided the stem is other than hexagonal,
      connecting means at the open second end,
      a central liquid passage, the central liquid passage open to, and extending from, the open second end to the closed first end, and
      at least one liquid outlet along the central liquid passage proximate the first end,
   (c) an angular cutting member, the cutting member having at least three angles, two of the angles opposing one another,
      the cutting member being affixed within the first end of the stem, proximate the opposing angles,
      the cutting member being substantially planar member having a third angle leading as a cutting tip,
      the cutting member presenting a cutting region having a periphery substantially greater than the closed first end,
   (d) a swivel member, comprising:
      (d1) a housing element having a central bore and a housing inlet with liquid connecting means,
      (d2) a body portion, the body portion being positioned for rotation within the central bore, the body portion having
         a central channel,
         an outlet in liquid engagement with the drilling stem liquid passage,
         a liquid inlet to the central channel and positioned proximate the housing inlet,
         a drill connecting member, the drill connecting member being opposite the outlet,
      (d3) a first seal member for providing a first water tight rotation seal between the body portion and the housing and
      (d4) a second seal member for providing a second water tight rotation seal between the body portion and the housing, the housing inlet and the body portion inlet being positioned between the first seal and the second seal the method comprising:
- (i) mounting the drill to the swivel member drill connecting member;
- (ii) mounting the elongated drill stem to the body portion outlet;
- (iii) mounting a liquid source to the housing inlet;
- (iv) placing the cutting member proximate the surface to be bored;
- (v) activating the liquid source;
- (vi) activating the drill;
- (vii) applying pressure to the drill; and,
- (viii) continuing to drill until the desired depth is reached, wherein liquid enters the central liquid passage through the liquid inlet and exits the central liquid through the at least one liquid outlet, the liquid cooling the drilling stem and carrying cuttings from the bore hole distal end to a proximal end.

* * * * *